(12) United States Patent
Hsieh

(10) Patent No.: US 8,375,159 B2
(45) Date of Patent: Feb. 12, 2013

(54) ELECTRONIC STORAGE DEVICE AND CONTROL METHOD THEREOF

(75) Inventor: Hsiang-An Hsieh, Chung Ho (TW)

(73) Assignee: A-Data Technology (Suzhou) Co., Ltd., Suzhou, Jiangsu Province (CN)

( * ) Notice: Subject to any disclaimer, the term of this patent is extended or adjusted under 35 U.S.C. 154(b) by 514 days.

(21) Appl. No.: 12/651,096

(22) Filed: Dec. 31, 2009

(65) Prior Publication Data

US 2010/0312950 A1   Dec. 9, 2010

(30) Foreign Application Priority Data

Jun. 4, 2009  (CN) .......................... 2009 1 0033794

(51) Int. Cl.
*G06F 12/00* (2006.01)
(52) U.S. Cl. ................. 711/103; 711/E12.008
(58) Field of Classification Search ................. 711/103, 711/E12.008
See application file for complete search history.

(56) References Cited

U.S. PATENT DOCUMENTS

| 5,638,534 A | 6/1997 | Mote, Jr. |
| 5,666,494 A | 9/1997 | Mote, Jr. |
| 7,594,157 B2 | 9/2009 | Choi et al. |
| 2009/0150641 A1* | 6/2009 | Flynn et al. ................. 711/202 |

* cited by examiner

*Primary Examiner* — Edward Dudek, Jr.
*Assistant Examiner* — John P Fishburn
(74) *Attorney, Agent, or Firm* — Cheng-Ju Chiang

(57) ABSTRACT

An electronic storage device (320) for connecting with a host system (100) includes a storage unit (360) including at least one memory segment which has at least one physical block, a memory unit (350) receiving access commands sent from the host system, and a control unit (340) connecting with said memory unit. Each of the access commands contains at least a logical address which corresponds to a physical block. The control unit determines the command execution order of the access commands according to adjacent extent of the physical blocks in said memory segment to which the logical addresses of said access commands correspond. A control method of the electronic storage device is also disclosed in the present invention.

12 Claims, 7 Drawing Sheets

ELECTRONIC STORAGE DEVICE AND
CONTROL METHOD THEREOF

BACKGROUND OF THE INVENTION

1. Field of the Invention

The present invention relates to an electronic storage device and the control method thereof, more particularly to a non-volatile solid-state electronic storage device and the control method thereof.

2. Description of Related Art

NAND-type flash memory is widely used in consuming products to be served as storage media because of rapid access speed and high reliability. Conventional solid-state data storage devices are Solid-Stage Disk (SSD), USB Flash Drive (UFD), memory cards etc. In particular, NAND-Type Flash Memory is mainly served as storage media.

FIG. 1 is a function schematic chart of a solid-state disk. The solid-state disk 120 connects with a host system 100 through disk drive interface 130. A control unit 140 executes commands of the host system 100 through system interface 110 and writes data into a storage media 160 or reads data from the storage media 160 according to logical addresses appointed by the commands. For realizing this function, the control unit 140 must be equipped with logical-to-physical address mapping function and the solid-state disk 120 should be equipped with the storage media 160 for storing logical-to-physical Address Mapping Tables which record relationships between the logical addresses and physical addresses. Since the logical-to-physical address Mapping Table needs large storage space, for saving storage space to simplify the mapping program and decrease cost of the control unit 140, the physical storage space will be divided into many memory segments with equal or unequal contents. Each memory segment stores the logical-to-physical Address Mapping Table thereof. Please refer to FIG. 2, when the host system 100 sends commands for reading or writing data in particular logical addresses, the control unit 140 determines the physical memory segment to which the logical address belongs according to the logical-to-physical Address Mapping Table. If the logical-to-physical Address Mapping Table of the particular memory segment was not loaded into the memory unit 150 of the control unit 140, then an unused table which is originally stored in the control unit 140 will be written back to the memory media 160 and the table needed by the command will be loaded from the memory media 160.

If the addresses appointed by the commands of the host system 100 are sequential, that is the addresses range from large to small or from small to large, the access speed of the storage device will not be influenced seriously. However, when the addresses appointed by the commands of the host system 100 are not sequential, then different memory segments should be visited. Thus, the access speed of the storage device will be influenced seriously because the logical-to-physical address mapping tables should be switched frequently by writing back to the memory media 160 and reloaded to the control unit 140.

Although memory capacity of the control unit 140 can be increased for accommodating the mapping tables, and more than two mapping tables of the memory segments can be permitted to be visited at the same time for avoiding switching the mapping tables too frequently, the method is still restricted by the capacity of the memory unit 150 of the control unit 140. Hence, it is desirable to design an improved structure to address problems mentioned above.

BRIEF SUMMARY OF THE INVENTION

Accordingly, an object of the present invention is to provide an electronic storage device which can be accessed fast and the lifetime thereof can be lengthened.

Another object of the present invention is to provide a control method of the electronic storage device which can be accessed fast and with longer lifetime.

In order to achieve the above-mentioned object, an electronic storage device for connecting with a host system comprises a storage unit comprising at least one memory segment which has at least one physical block, a memory unit receiving access commands sent from said host system, and a control unit connecting with said memory unit. Each of said access commands contains at least a logical address which corresponds to a physical block. The control unit determines the command execution order of the access commands according to adjacent extent of the physical blocks in said memory segment to which the logical addresses of said access commands correspond.

In order to achieve the above-mentioned object, a control method of an electronic storage device comprising at least one memory segment which contains at least one physical block comprises the steps of: receiving and storing access commands, each access command comprising at least one logical address corresponding to a physical block; checking whether said access command need to be reordered; if the access commands need to be reordered, reordering the command execution order according to the adjacent extent of the physical blocks in the memory segment to which the logical addresses of said access commands correspond; if the access commands need not to be reordered, executing the access commands according to the receiving order of said access commands.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
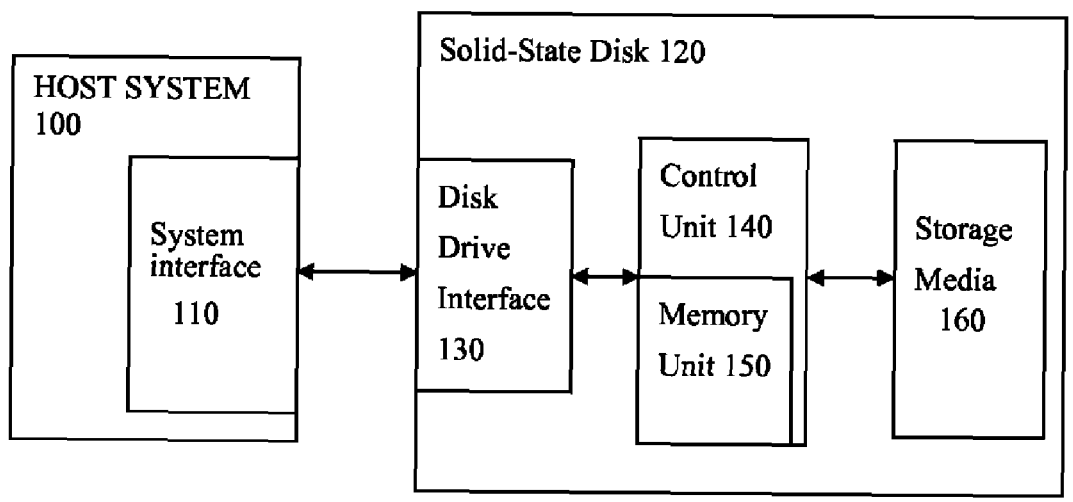
FIG. 1 is a function schematic chart of a solid-state disk according to a preferred embodiment of the present invention.
Figure 2:
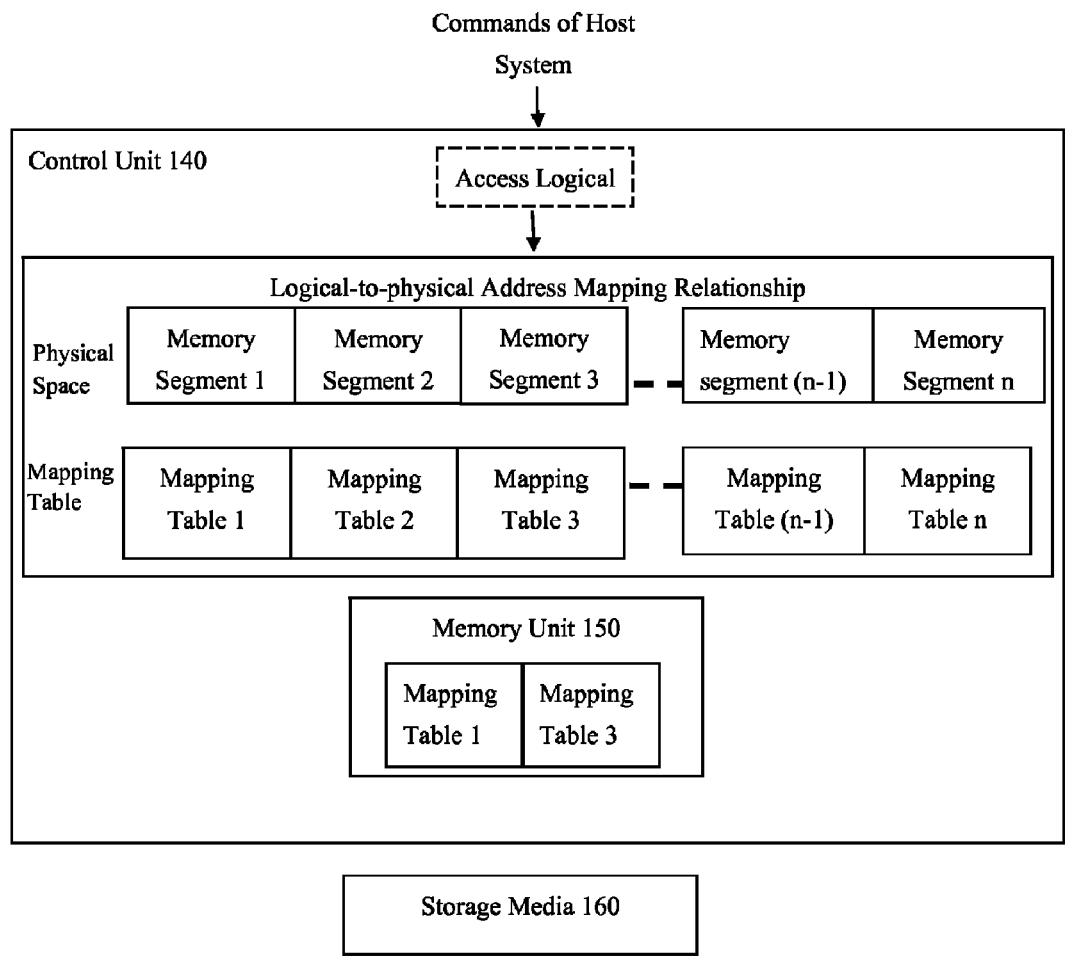
FIG. 2 is a mapping relationship chart between physical spaces and logical-to-physical Address Mapping Table according to the preferred embodiment of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Figure 3A:
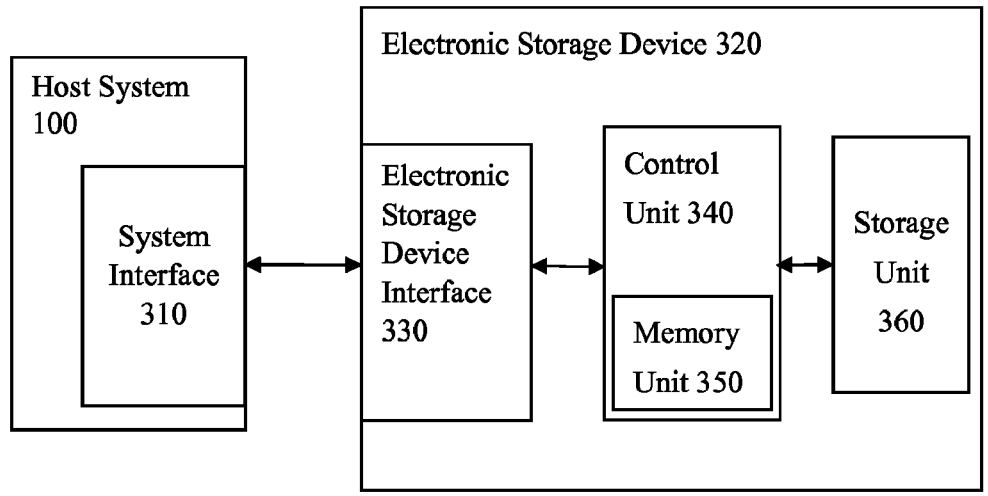
FIG. 3A is the first system construction chart of the electronic storage device according to the preferred embodiment of the present invention.

FIG. 3A is the first system construction chart of an electronic storage device 320 of the preferred embodiment of the present invention. The electronic storage device 320 comprises an electronic storage device interface 330 connecting with a system interface 310 of a host system 100 for exchanging data with the host system 100, a control unit 340 for executing commands of the host system 100 and comprising a memory unit 350, and a storage unit 360 consisting of flash memory cells and connecting with the control unit 340 for data storage. The memory unit 350 consists of volatile solid-state memory cells for providing memory space to command queue and storing the command queue.

Figure 3B:
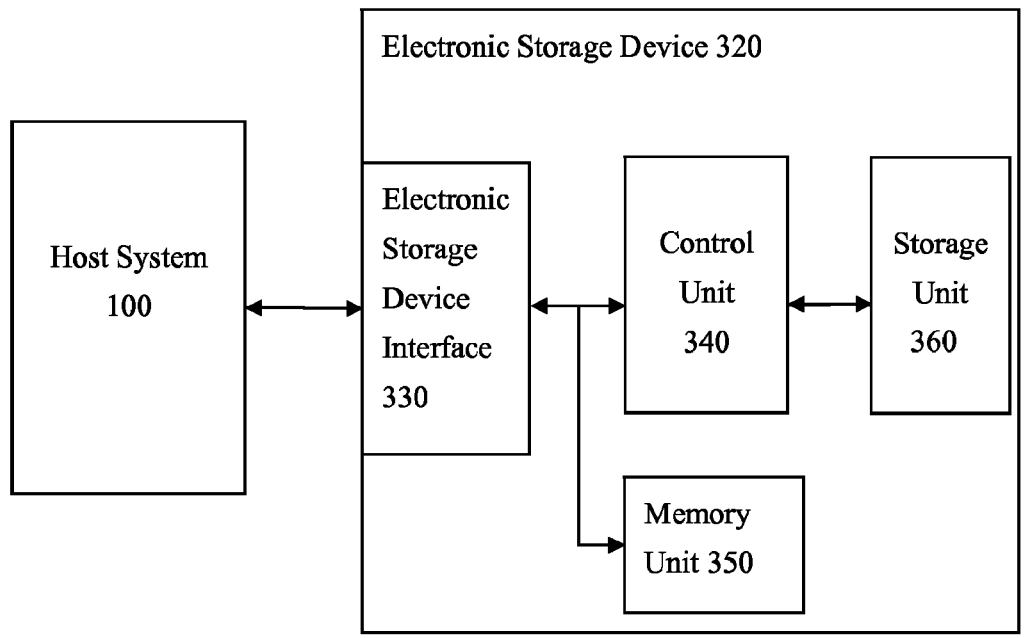
FIG. 3B is the second system construction chart of the electronic storage device according to the preferred embodiment of the present invention.

A second system construction chart is also provided in the present invention which stores the commands received by the electronic storage device 320 in a separate memory unit 350 and the control unit 340 executes the commands. The second system construction chart also achieves the same effect as that of the first system construction chart and is not limited by the store capacity of the control unit 340. FIG. 3B is the second system construction chart of the electronic storage device 320 of the preferred embodiment of the present invention. The electronic storage device 320 comprises an electronic storage device interface 330 connecting with the system interface 310 of the host system 100 for data exchange between the electronic storage device 320 and the host system 100, the memory unit 350 coupled with the control unit 340 and also connecting with the electronic storage device interface 330 for storing the command queue, the storage unit 360 consisting of flash memory cells for storing data, and the control unit 340 executing the commands of the host system 100.

Based on the system constructions described above, when the host system 100 sends out the commands, the control unit 340 checks the commands stored in command queue of the volatile memory unit 350 and determines whether the commands of the command queue need to be reordered (or whether there is restriction to command execution order) according to the types of the commands and the logical addresses appointed to be accessed. If the commands need to be reordered, the control unit 340 will classify the commands according to the adjacent extent of the logical addresses of the commands. The command which has the high adjacent extent to the previous command will be executed in a high priority. Then the determined execution order of the commands will be recorded in the control unit 340 to constitute the command execution order index. The control unit 340 executes the commands to finish the data transmission according the order recorded by the command execution order index. After each command is executed by the control unit 340, the finished state will be informed to the host system 100 by the control unit 340 and the command queue space occupied by the command is erased. Then the control unit 340 will check whether a new command is received. If yes, the new command will be stored in the spare space in the command queue. Then the command execution order index will be checked again and the new command will be inserted to a proper position in the command execution order index. If there is no new command, the control unit 340 executes all commands and cleans the commands from the command execution order index. Then, the control unit 340 restores to stand-by state.

The "adjacent extent of the logical addresses" means that logical addresses for access appointed by two or more than two commands with the same type (i.e., both are write commands or both are read commands) have corresponding physical addresses which can be classified in the same group since the physical addresses belong to the same memory segment after calculation. The memory segment has at least one physical block.

Figure 4:
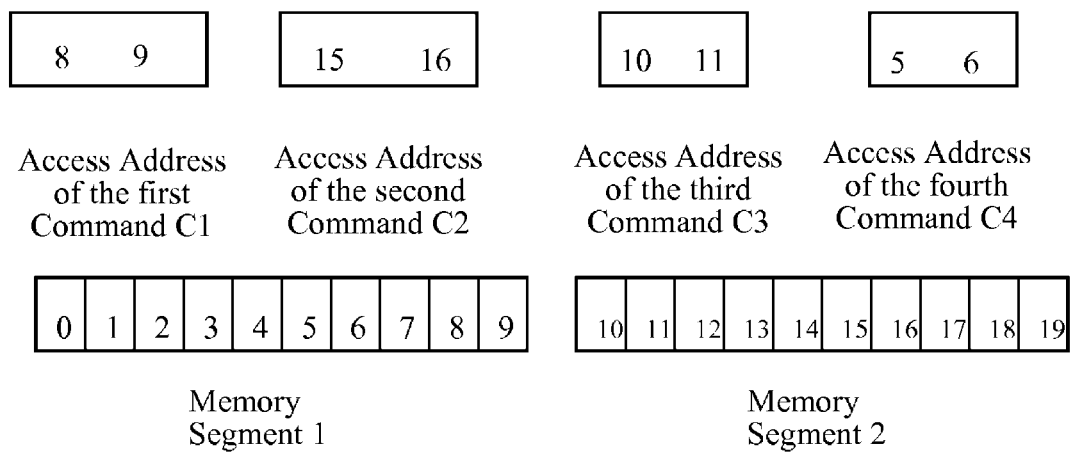
FIG. 4 is a schematic chart illustrating how to adjust the command execution order among different memory segments according to the preferred embodiment of the present invention.

FIG. 4 is a schematic chart illustrating how to adjust the command execution order among different memory segments. It is supposed that the storage unit 360 includes the first memory segment 1 and the second memory segment 2. The first memory segment 1 comprises memory blocks 0 to 9. The second memory segment 2 comprises memory blocks 10 to 19. It is supposed that only one logical-to-physical Address Mapping Table of one memory segment can be transferred and there are four commands C1, C2, C3, C4 in the command queue. The access addresses of the first command C1 are physical blocks 8, 9. The access addresses of the second command C2 are physical blocks 15, 16. The access addresses of the third command C3 are physical blocks 10, 11. The access addresses of the fourth command C4 are physical blocks 5, 6. In addition, the access data of the four commands are the same.

After the command execution order is reordered according to the "adjacent extent of the logical addresses", the access commands belonging to the same memory segment are placed together. So, the command execution order of the command queue is "C1, C4, C2, C3" with the order of the command access addresses of 8, 9, 5, 6, 15, 16, 10, 11. Or the command execution order of the command queue is "C4, C1, C3, C2" with the command access addresses of 5, 6, 8, 9, 10, 11, 15, 16. Therefore, the access commands C1, C4, C2, C3 are executed by the control unit 340, the logical-to-physical Address Mapping Table of the first memory segment 1 is read by the control unit 340 and the physical blocks 8, 9, 5, 6 are accessed. After the access to the physical blocks 8, 9, 5, 6, the logical-to-physical Address Mapping Table of the first memory segment 1 is stored back. The logical-to-physical Address Mapping Table of the second memory segment 2 is read for access to the physical blocks 15, 16, 10, 11. Thus, the convert frequency among the logical-to-physical Address Mapping Tables can be reduced effectively for improving data storage efficiency.

Figure 5:
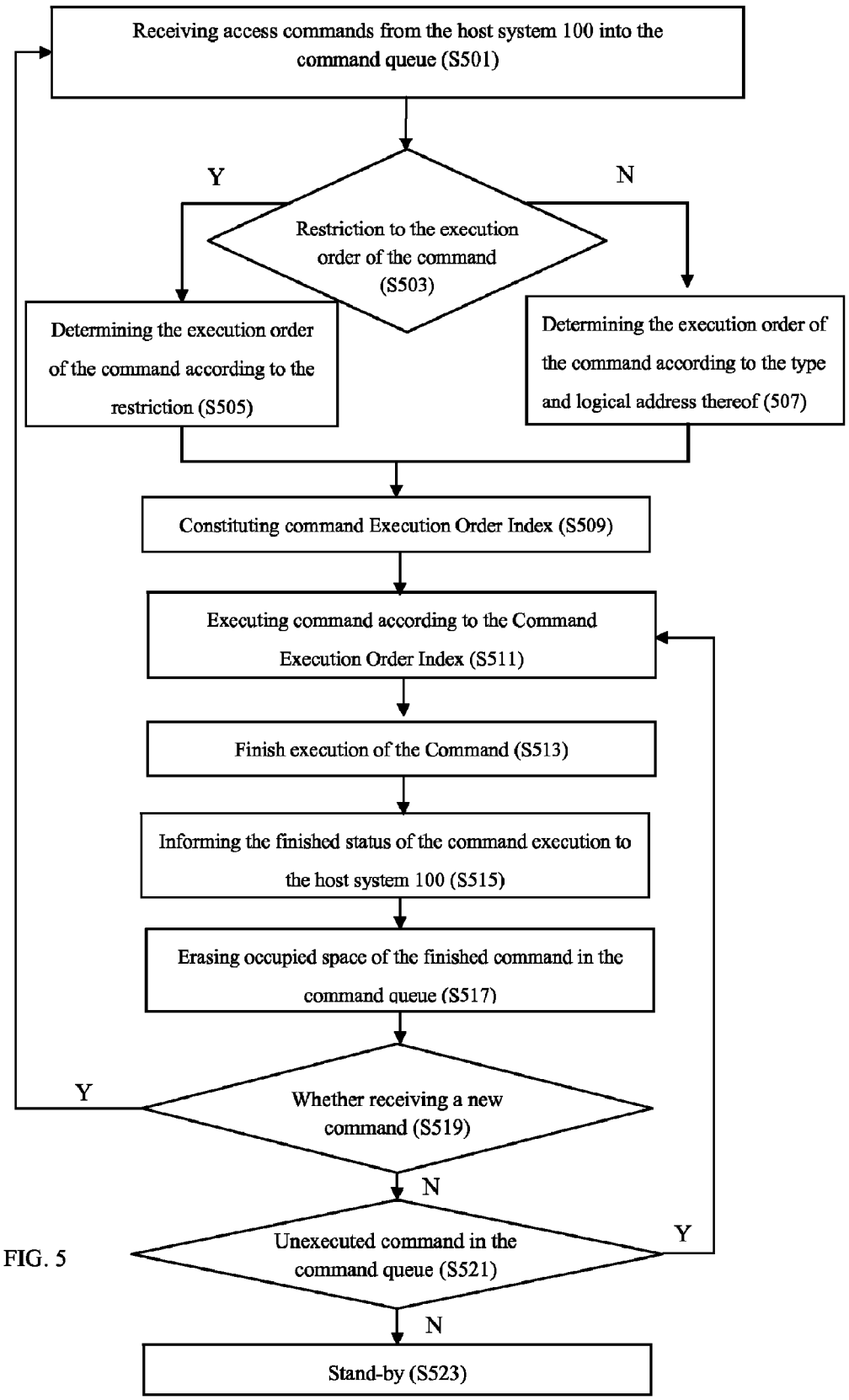
FIG. 5 is a flowchart of the command execution orders according to the preferred embodiment of the present invention.

FIG. 5 is a flowchart of the command execution order of the present invention. The electronic storage device 320 receives the access commands of the host system 100 to the command queue (step S501); the command execution order is checked to see whether there is restriction thereto (Step S503), that is to judge whether the execution order should be reordered according to the types of the access commands and the appointed access logical addresses; if there is restriction to the execution order, the order will be executed according to the restriction (Step S505), that is the execution order of the access commands will be determined according to early or late execution restriction of the access commands; if there is no restriction to the execution order, the execution order of the access commands will be determined according to the types of the access commands and the appointed access logical addresses (Step S507); the electronic storage device 320 will record the determined execution order to form the command execution order index (Step S509); till now, the command execution order has been determined, then the control unit 340 executes the commands according to the command execution order index (Step S511); then the control unit 340 finishes execution of the command (Step S513); the finished status of the command execution will be informed to the host system 100 by the electronic storage device 320 (Step S515); the occupied space of the finished command in the command queue will be cleaned by the control unit 340 (Step S517); the control unit 340 judges whether there is a new command (Step S519); if there is a new command, then the steps described above will be operated once again, then turned to step S501; if there is no new command, the control unit 340 will check whether there is a command has not been executed in the execution queue (Step S521); if there is a command has not been executed, the command will be executed according to the recorded command execution order index (Step S521); if all commands have been executed, the electronic storage device 320 will restore to its stand-by status (Step S523).

The method of determining the better command execution order is: 1.classifying the commands according to the access types (There is one situation should be excluded. That is the same address is read first then written or written first then read should be executed following the order. So, the command whose execution order cannot be changed should be excluded from the classification). 2.Dividing the commands into groups according to the "adjacent extent of the logical addresses" of the commands. 3. The command with the same type as that of the previous accessed command will be executed in advance and then a command group with the largest access data in the same memory segment will be then executed. When executed, in the same memory segment, the command with larger access data will be executed in a higher priority. The accessed addresses will range from the small ones to the large ones.

Figure 6A:
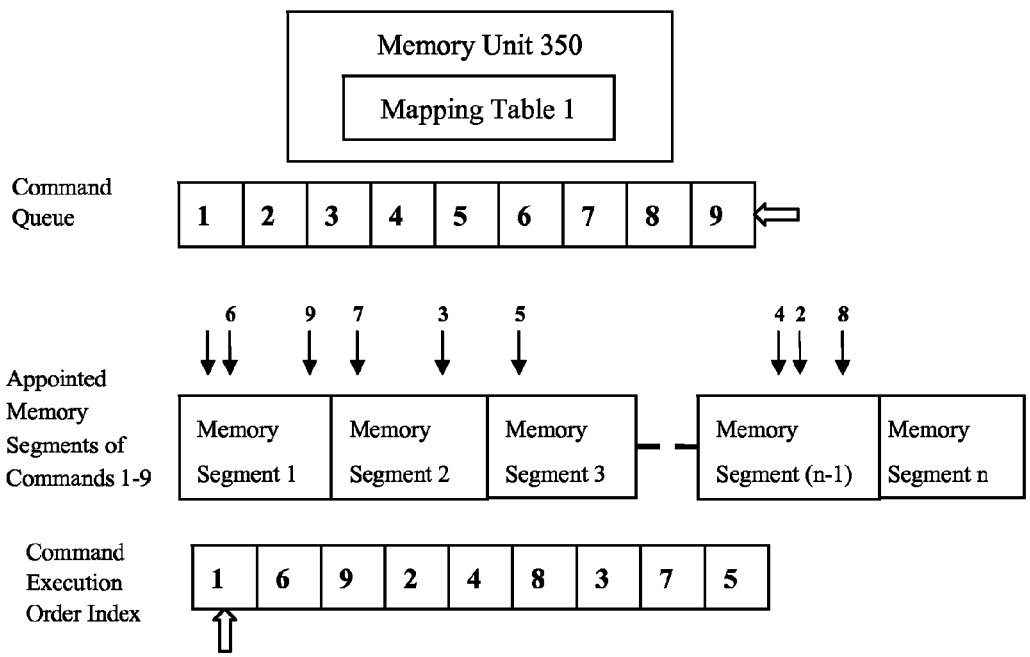
FIG. 6A is a sketch chart for illustrating the adjustment of the orders of the command execution.

FIG. 6A is a schematic chart illustrating how to adjust the command execution order of the present invention. The logical-to-physical Address Mapping Table 1 is stored in the memory unit 350. Commands 1, 6, 9 of the command queue are commands in the logical-to-physical Address Mapping Table 1, that is the access memory segment of these three commands 1, 6, 9 is memory segment 1. Commands 3, 7 correspond to the memory segment 2, command 5 corresponds to the memory segment 3. Commands 2, 4, 8 correspond to memory segment (n-1). Since the logical-to-physical Address Mapping Table 1 is stored in the memory unit 350, the commands related to the memory segment 1 will be executed in a higher priority. In other memory segments, the access commands with large access data will be selected to be executed in advance. If the access data written into the memory segment (n-1) of the commands 2, 4, 8 are larger than that of the commands 3, 7 written into the memory segment 2, the commands 2, 4, 8 will be executed prior to the commands 3, 7. Or, the commands 3 or 7 will be executed first. Therefore, the command execution order index is commands 1, 6, 9, 2, 4, 8, 3, 7, 5.

Figure 6B:
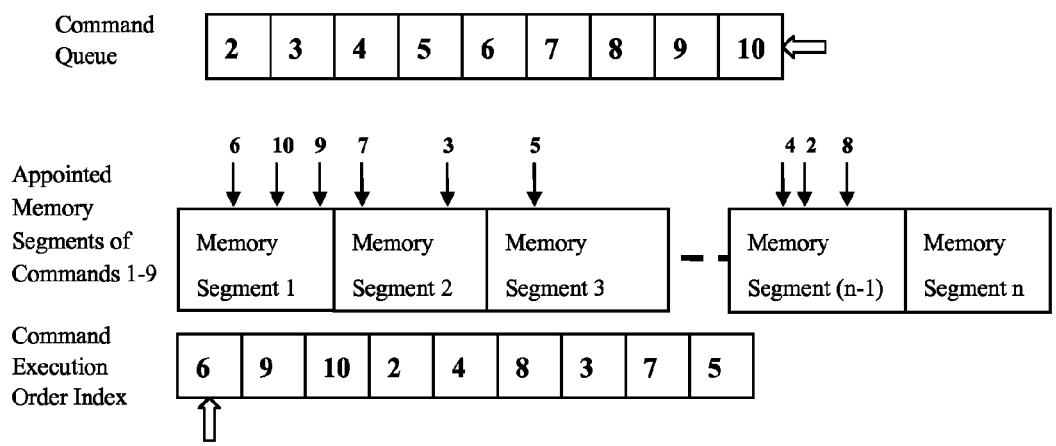
FIG. 6B is a sketch chart illustrating the adjustment of the orders of the command execution after receiving new commands.

FIG. 6B is a schematic chart illustrating how to adjust the command execution order after the control unit 340 receives a new command of the present invention. The control unit 340 will clean the occupied space of a command in the command queue which has been executed for receiving newly arrived command. In addition, the control unit 340 will check whether there is a new command after each command has been executed. If there is a new command, the new command will be stored to the spare space in the command queue and placed in a suitable position. For example, after the command 1 has been executed, a new command 10 is received by the host system 100, and the control unit 340 will check the memory segment of the access logical address of the command 10. If the appointed physical address of the command 10 belongs to the logical-to-physical Address Mapping Table 1, the execution order of the command 10 will have precedence over the commands of the memory segment 2. Therefore, the command execution order index is commands 6, 9, 10, 2, 4, 8, 3, 7, 5.

Figure 6C:
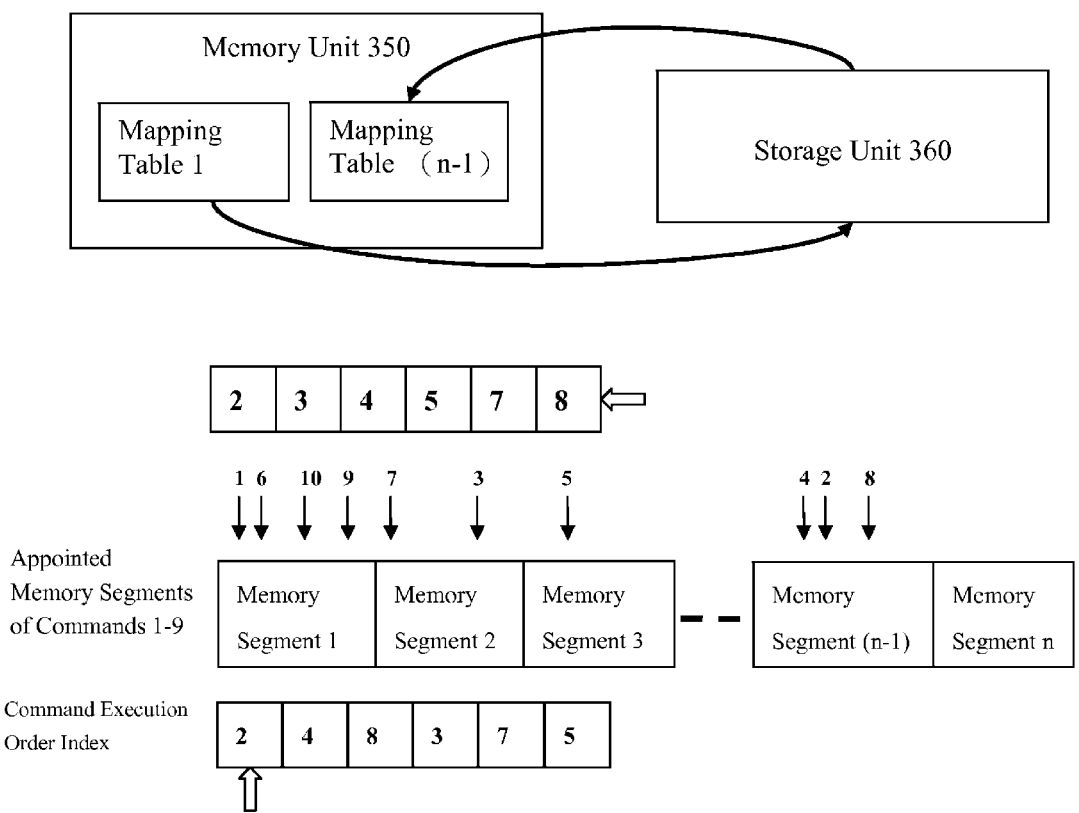
FIG. 6C is an executive sketch chart illustrating how to operate after a control unit executing all commands of the same memory segment.

FIG. 6C is a schematic chart illustrating the following operation after the commands of the whole memory segment have been executed by the control unit 340. The control unit 340 converts the logical-to-physical Address Mapping Table after finishing command execution of the memory segment 1 and executes data access duties in other memory segments. The logical-to-physical Address Mapping Table 1 will be erased from the memory unit 350 and rewritten to the storage unit 360. The logical-to-physical Address Mapping Table (n-1) will be read for the execution of the commands 2, 4, 8. Therefore, the command execution order is commands 2, 4, 8, 3, 7, 5.

The present invention classifies the commands in the command queue by access types, the command which accesses the same memory segment as that of the command previously executed will be executed in a higher priority except those commands who cannot be changed the early or late order. Thus, the logical-to-physical Address Mapping Tables can be avoided from being converted. Then the command with largest access data in the memory segment will be selected to be executed. Other access commands of the same memory segment will be executed later. Finally, the logical-to-physical Address Mapping Table will be converted for the execution of data access duties in other memory segments. Thus, the convert times of the logical-to-physical Address Mapping Table could be reduced to achieve the purpose of improving the access efficiency. Further, the command execution order could be reordered when new command arrives, which reduces additional data transfer and erase work and lengthens the life time of the NAND-type flash memory.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

I claim:

1. An electronic storage device adapted for connecting with a host system, comprising:
   a storage unit comprising at least one memory segment which has at least one physical block;
   a memory unit receiving access commands sent from said host system, each of said access commands containing at least a logical address which corresponds to a physical block; and
   a control unit connecting with said memory unit and determining a command execution order of said access commands according to adjacent extent of the physical blocks in said memory segment to which the logical addresses of said access commands correspond, and wherein said adjacent extent stands for the logical addresses of said access commands correspond to the same memory segment;
   wherein when there is a new command arrived, the command execution order is checked to insert the new arrived command thereinto;
   wherein after all commands of the same memory segment have been executed, a new command is selected to execute, and wherein the command which has the same type as that of the memory segment previously accessed is selected to be executed firstly and the command which have the relatively large access data is selected to be executed secondly.

2. The electronic storage device as claimed in claim 1, wherein the memory unit is contained in the control unit and consists of volatile solid-state memory cells.

3. The electronic storage device as claimed in claim 1, wherein the memory unit is coupled with the control unit and consists of volatile solid-state memory cells.

4. The electronic storage device as claimed in claim 1, wherein the storage unit consists of flash memory cells.

5. The electronic storage device as claimed in claim 1, wherein the control unit connects with the host system via an electronic storage device interface thereof and a system interface of the host system.

6. The electronic storage device as claimed in claim 1, wherein the memory unit comprises at least one logical-to-physical Address Mapping Table, and wherein each logical-to-physical Address Mapping Table records the relationship between the logical addresses and the corresponding physical blocks of each memory segment.

7. The electronic storage device as claimed in claim 6, wherein the storage unit comprises more than one memory segment, and wherein each memory segment comprises a logical-to-physical Address Mapping Table recording the one-to-one relationship between the logical addresses and the physical blocks thereof.

8. A control method of an electronic storage device, said electronic storage device comprising at least one memory segment which contains at least one physical block, said control method of the electronic storage device comprising the steps of:
   receiving and storing access commands, each access command comprising at least one logical address corresponding to a physical block;
   checking whether said access command need to be reordered;
   if the access commands need to be reordered, reordering a command execution order according to the adjacent extent of the physical blocks in the memory segment to which the logical addresses of said access commands correspond; and
   if the access commands need not to be reordered, executing the access commands according to the receiving order of said access commands;
   wherein said adjacent extent stands for the logical addresses of said access commands correspond to the same memory segment;
   further comprising a step of checking the command execution order to insert the new arrived command thereinto when there is a new command arrived;
   further comprising a step of selecting a new command to execute after all commands of the same memory segment have been executed, and wherein the command which has the same type as that of the memory segment previously accessed is selected to be executed firstly and the command which have the relatively large access data is selected to be executed secondly.

9. The control method of the electronic storage device as claimed in claim 8, wherein said access commands are executed from one memory segment to next segment after the command execution order has been reordered.

10. The control method of the electronic storage device as claimed in claim 8, further comprising a step of erasing the occupied space of an access command in said electronic storage device after said access command has been executed.

11. The control method of the electronic storage device as claimed in claim 8, wherein the electronic storage device further comprises a memory unit consisting of volatile solid-state memory cells to receive and store the access commands.

12. The control method of the electronic storage device as claimed in claim 8, wherein the electronic storage device further comprises a memory unit comprising at least one logical-to-physical Address Mapping Table which records the relationship between the logical addresses and corresponding physical blocks of each memory segment.

* * * * *